April 12, 1960 G. A. LYON 2,932,540
WHEEL COVER
Filed Nov. 1, 1955
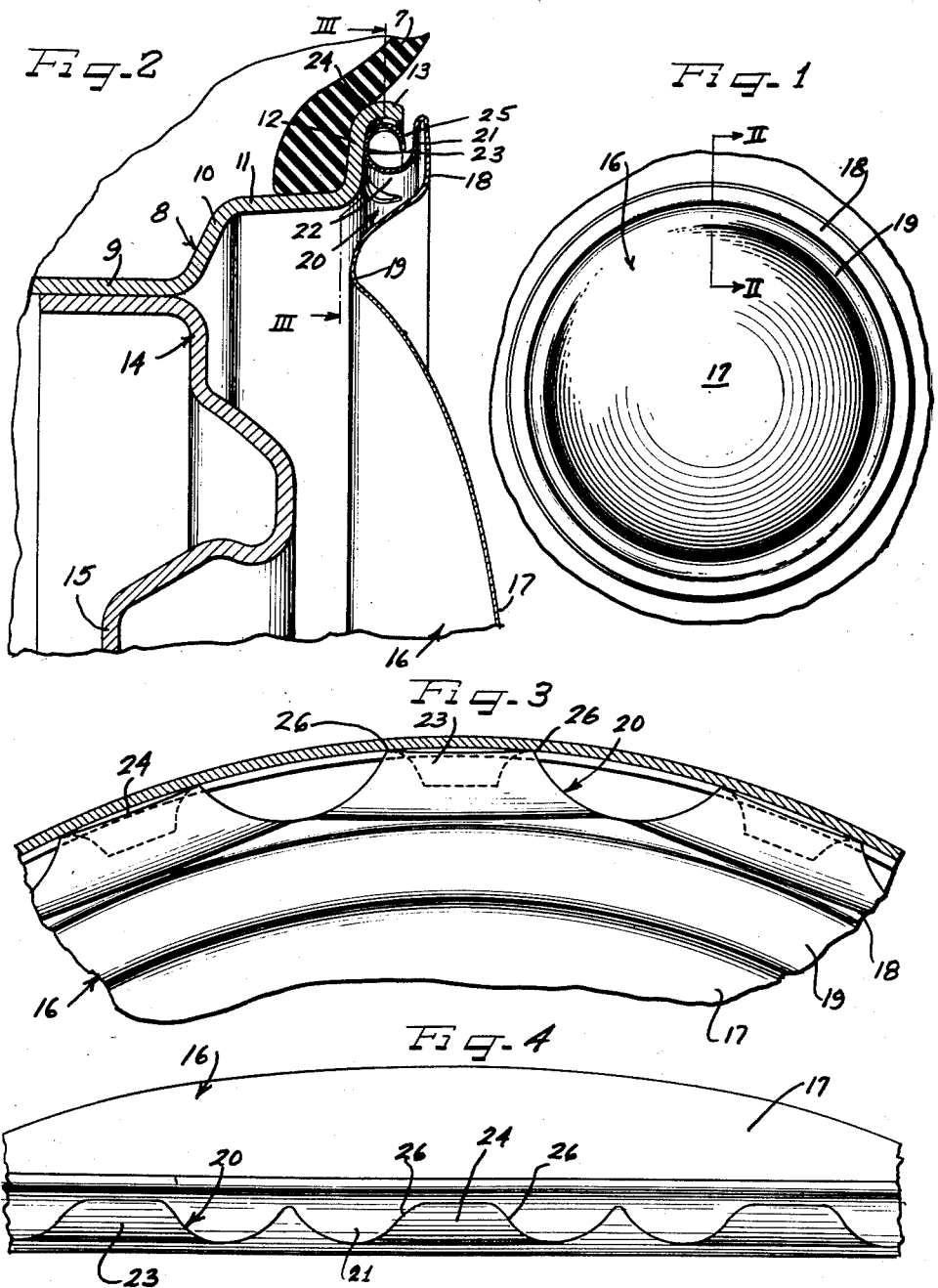
Inventor
GEORGE ALBERT LYON

United States Patent Office 2,932,540
Patented Apr. 12, 1960

2,932,540
WHEEL COVER
George Albert Lyon, Detroit, Mich.

Application November 1, 1955, Serial No. 544,137

1 Claim. (Cl. 301—37)

This invention relates generally to a wheel cover and more particularly to a new and improved wheel cover construction which cooperates with the wheel in an improved manner.

In the manufacture of wheel covers one of the perplexing problems facing manufacturers relates to how means may be provided on the cover so as to insure relative co-rotation of the cover and wheel when in use upon a vehicle.

An object of this invention is to provide a new and improved cover construction having novel retaining extensions provided with means to insure relative co-rotation of the cover when mounted upon the wheel.

Another object of this invention is to provide a new and improved cover construction having looped retaining extensions having an inner housing which may receive a wheel balancing weight therein.

Still another object of this invention relates to a new and improved cover construction which may be economically manufactured on a large production scale.

A further object of the invention is to provide an improved wheel cover having curled retaining fingers engageable under tension within a grooved wheel part, such fingers having biting edges at their sides conformably engageable with the surface within the groove and effecting resistance not only to circumferential but also axially outward displacement of the fingers relative to the wheel.

Other objects and features of this invention may more fully appear from the following detailed description taken in connection with the accompanying drawing which illustrates a single embodiment thereof and in which:

Figure 1 is a fragmentary side elevation of a wheel structure having my novel cover mounted thereon;

Figure 2 is an enlarged fragmentary cross sectional view taken on substantially the line II—II of Figure 1 looking in the direction indicated by the arrow;

Figure 3 is a fragmentary sectional elevational view looking axially outwardly substantially on the line III—III of Figure 2 and showing the novel retaining action between the cover and tire rim; and Figure 4 is an enlarged fragmentary edge elevation of my novel cover.

As shown on the drawings:

The reference character 7 designates generally a conventional tire construction which may be of the tube or tubeless type mounted in the customary way upon a standard multi-flanged tire rim 8. This tire rim 8 includes an attachment flange 9, a generally radially outwardly extending flange 10, a generally axially outwardly extending flange 11, a generally radially outwardly extending flange 12, and a generally axially outwardly extending terminal flange 13. The terminal rim flange 13 possesses an axially arched and circumferentially curved rim surface area on its radially inner side.

The tire rim 8 and more particularly the attachment flange 9 is secured to a supporting wheel body or load sustaining member 14 by any suitable means, and includes the usual central bolt-on flange 15 (partially shown).

Cooperable with this conventional wheel assembly is a sheet metal cover 16 having incorporated thereon a number of the advantageous features of this invention. This cover may be made from any suitable material such, for example, as stainless steel sheet which lends itself to manufacture on a large production basis with any suitable press equipment.

The cover 16 includes a central crown or hub portion 17 and an outer annular marginal portion 18 symmetrically connected to the hub portion 17 by an intermediate annular depressed portion 19.

Connected to the outer margin 18 of the cover are my novel looped circumferentially spaced resilient retaining extensions 20. Each of these extensions 20 may be formed integral with the cover margin 18. This is accomplished by turning the cover margin under at its outer periphery in such a manner as to provide a generally radially inwardly extending annular flange portion 21 which is in spaced underlying relation to the margin 18.

The turned under flange portion 21 has integrally joined thereto at circumferentially spaced intervals the aforementioned looped extensions 20. These extensions 20 each include a generally axially inwardly extending portion 22, an intermediate generally radial flange portion 23, a generally axially extending radially inwardly bowed and radially outwardly arched flange portion 24 and a turned under terminal flange portion 25 with the margin 18 in overlying spaced relation thereto.

It will be noted that flange portions 23 and 24 when in tensioned engagement with the tire rim 8 nest against, rim flanges 12 and 13 and into the arched groove within the rim flange 13. These portions 23 and 24 also cooperate with flange portions 21, 22 and 25 to define a housing in which wheel balancing weights may be resiliently retained therein if desired.

In view of the foregoing it is now apparent that the instant cover construction may be stamped and formed from a single piece of material if desired having a predetermined number of retaining extensions 20 thereon.

The extensions 20 each have arcuately or circumferentially spaced converging spiral-like edges 26—26 (Figures 3 and 4) which edges have edge areas on the bowed flange portion 24 serving as biting edges or stops to resist turning of the cover when in assembly with the wheel while at the same time sustaining the cover in assembly with the wheel. It should be noted the axially extending edge area which is engaged with the inside surface of the rim flange 13 is nestingly engaged there against along the axial extent of the terminal rim flange 13.

The instant cover 16 may be assembled upon the wheel and more particularly the tire rim 8 by first axially aligning the cover margin 18 with respect to the rim flanges 12 and 13. Thereafter the cover may be urged axially inwardly with the looped resilient extensions 20 each engaged tentatively against the outer edge of the rim flange 13 and upon the application of a further force, the extensions 20 may be progressively flexed radially inwardly until the flange portion 24 and more particularly the flange edges 26—26 snaps into tensioned engagement behind the shouldered rim 13. When the cover is in assembly with the wheel it will be noted that the flange portion 23 is bottomed against the rim flange 12 and it is in this manner that axially inward displacement of the cover is minimized. Since the edges 26 in the curled form of the fingers 20 converge toward the tips of the fingers, the edges 26 face not only circumferentially but also generally axially outwardly in the finger portions 24 which press into the groove provided by the rim flange 13. As a result an effective gripping resistance coaction with the overhanging shoulder in the axially outer side of the rim flange groove to axially outward displacement of the fingers is effected in addition to resistance to circumferential displacement. Also, by virtue of the fact that the looped portion 20 lies in spaced relation to the margin 18 when axial impacts are applied to the cover the resilient portion 20 may flex slightly in order to absorb at least some of the impact force.

By virtue of the fact that the looped extensions 20 have spaced edges 26—26 provided on each of same co-rotation of the cover and wheel is insured.

Removal of the cover may be carried out by inserting a suitable pry-off tool underneath the margin 18 in engagement with the terminal 25 and upon the application of a suitable pry-off force the cover 16 may be progressively disengaged from the wheel.

It will be understood that modifications and variations may be effected without departing from the scope of the novel concepts of the present invention.

I claim as my invention:

In a wheel structure including an annular portion extending generally axially and providing a generally radially opening groove having an overhanging generally axially inwardly facing shoulder at its axially outer side, a wheel cover for disposition over the outer side of the wheel and having a circumferentially spaced series of curled cover retaining fingers disposed to press under resilient tension into the groove and having side edges substantially conformably engaging in said groove and grippingly biting the surface within the groove, said edges following the curvature of the fingers and converging toward the tips of the fingers and facing generally circumferentially and axially outwardly in at least the portions thereof engaging the shoulder portion within said groove to thereby resist axially outward displacement as well as circumferential displacement of the fingers relative to said grooved wheel portion.

References Cited in the file of this patent

UNITED STATES PATENTS

| | | |
|---|---|---|
| 2,404,389 | Lyon | July 23, 1946 |
| 2,544,705 | Lyon | Mar. 13, 1951 |
| 2,683,629 | Lyon | July 13, 1954 |
| 2,698,203 | Landell | Dec. 28, 1954 |
| 2,732,262 | Buerger | Jan. 24, 1956 |